US012656723B2

(12) United States Patent
Nohara

(10) Patent No.: US 12,656,723 B2
(45) Date of Patent: Jun. 16, 2026

(54) IMAGE FORMING APPARATUS

(71) Applicant: KYOCERA Document Solutions Inc., Osaka (JP)

(72) Inventor: Yuta Nohara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/991,428

(22) Filed: Dec. 21, 2024

(65) Prior Publication Data

US 2025/0208560 A1 Jun. 26, 2025

(30) Foreign Application Priority Data

Dec. 25, 2023 (JP) ................................ 2023-217941

(51) Int. Cl.
*G03G 15/00* (2006.01)
*G03G 15/08* (2006.01)
*G03G 21/16* (2006.01)

(52) U.S. Cl.
CPC ..... *G03G 21/1619* (2013.01); *G03G 15/0867* (2013.01); *G03G 21/1633* (2013.01); *G03G 21/1647* (2013.01)

(58) Field of Classification Search
CPC ........... G03G 15/0867; G03G 21/1619; G03G 21/1633; G03G 21/1647
USPC ................................................. 399/107, 110
See application file for complete search history.

(56) References Cited

U.S. PATENT DOCUMENTS 7,684,730 B2 * 3/2010 Furuta .................. G03G 15/161 399/258
8,019,252 B2 * 9/2011 Funada .............. G03G 21/1623 399/258
10,545,430 B2 1/2020 Nohara et al.
10,884,355 B2 1/2021 Nohara et al.
(Continued)

FOREIGN PATENT DOCUMENTS

JP 2022-022444 A 2/2022

OTHER PUBLICATIONS

The extended European search report issued by the European Patent Office on May 16, 2025, which corresponds to European Patent Application No. 24221344.5-1001 and is related to U.S. Appl. No. 18/991,428.

*Primary Examiner* — Hoan H Tran
(74) *Attorney, Agent, or Firm* — Studebaker Brackett PLLC

(57) ABSTRACT

An image forming apparatus includes a plurality of container groups, and a container housing. The container groups include a plurality of toner containers containing toner of different colors arranged in a left-and-right directions. The container housing houses the container groups arranged in an upper-and-lower direction. The toner containers of the container groups arranged in the upper-and-lower direction are shifted in the left-and-right direction. The container housing includes a lower rail, an upper rail, and an opening frame. The lower rail houses lower halves of the toner containers of the container group. Then upper rail houses upper halves of the toner containers of the container group and is connectable to the lower rail. The opening frame has openings to and from which the toner containers are attached and detached. A container rail assembly in which the lower rail and the upper rail are connected is assembled to the opening frame.

5 Claims, 12 Drawing Sheets

(56) References Cited

U.S. PATENT DOCUMENTS

| | | | | |
|---|---|---|---|---|
| 11,086,265 | B2 * | 8/2021 | Nohara | G03G 21/1604 |
| 11,131,958 | B2 * | 9/2021 | Tanio | G03G 21/1676 |
| 11,340,538 | B2 * | 5/2022 | Nohara | G03G 15/086 |
| 2019/0086832 | A1 | 3/2019 | Nohara et al. | |
| 2019/0187602 | A1 | 6/2019 | Nohara | |
| 2020/0117117 | A1 | 4/2020 | Nohara et al. | |

* cited by examiner

IMAGE FORMING APPARATUS

INCORPORATION BY REFERENCE

This application is based on and claims the benefit of priority from Japanese patent application No. 2023-217941 filed on Dec. 25, 2023, which is incorporated by reference in its entirety.

BACKGROUND

The present disclosure relates to an image forming apparatus provided with an attachable and detachable toner container.

In an electrophotographic image forming apparatus, one toner container is generally provided for each color, and a toner is supplied from each toner container to a corresponding developing device. When the toner container becomes empty, the image forming apparatus is temporarily stopped to replace the toner container.

On the other hand, there is also known an image forming apparatus provided with an upper container group and a lower container group each including the four toner containers in which the toner of four colors (yellow, cyan, magenta, and black) are stored. The toner containers of the upper container group and the toner containers of the lower container group are arranged to be shifted in the left-and-right direction, so that a dimension of a toner container housing along the left-and-right direction can be shortened. Thus, since the two toner containers are provided for each color, even when one toner container becomes empty, the toner can be supplied from the other toner container, so that the stopping time of the image forming apparatus accompanying the replacement of the toner container can be shortened.

In the image forming apparatus described above, it is necessary to house many toner containers at appropriate positions in the apparatus main body. Therefore, the image forming apparatus is provided with a container housing which houses the upper container group and the lower container group and is attached to the apparatus main body. The container housing can be configured to easily arrange a plurality of the toner containers at appropriate positions, and preferably has a compact size as much as possible.

SUMMARY

An image forming apparatus according to the present disclosure includes a plurality of container groups, and a container housing. The container groups include a plurality of toner containers containing toner of different colors arranged side by side in a left-and-right directions. The container housing houses the container groups arranged in an upper-and-lower direction. The toner containers of the container groups arranged in the upper-and-lower direction are shifted in the left-and-right direction. The container housing includes a lower rail, an upper rail, and an opening frame. The lower rail houses lower halves of the toner containers of the container group. Then upper rail houses upper halves of the toner containers of the container group and is connectable to the lower rail. The opening frame has openings to and from which the toner containers are attached and detached. A container rail assembly in which the lower rail and the upper rail are connected is assembled to the opening frame.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an image forming apparatus according to one embodiment of the present disclosure will be described.

Figure 1:
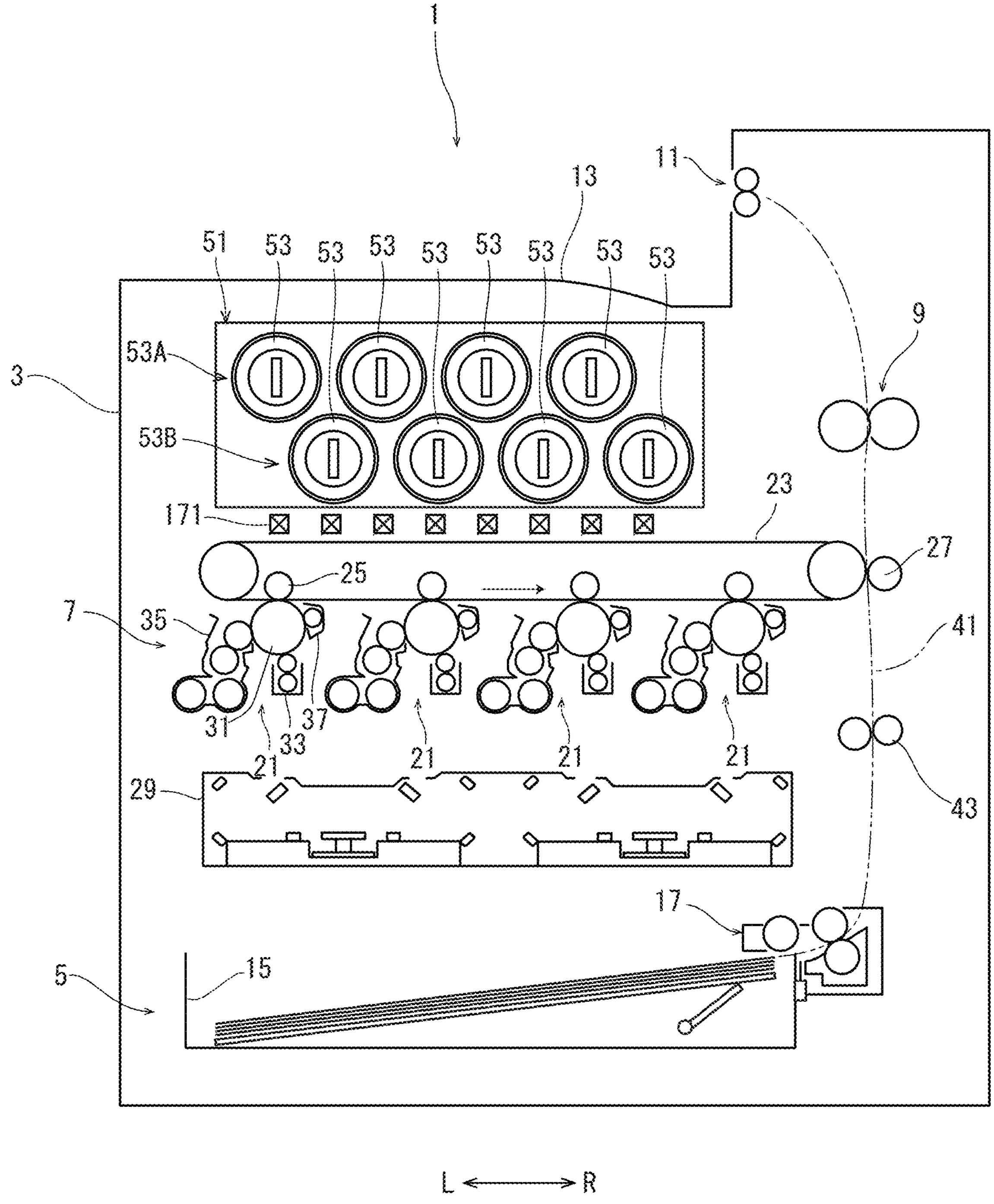
FIG. 1 is a front view schematically showing an internal configuration of an image forming apparatus according to one embodiment of the present disclosure.

With reference to FIG. 1, an entire configuration of the image forming apparatus 1 will be described. FIG. 1 is a front view schematically showing an internal configuration of the image forming apparatus 1. Up, Lo, Fr, Rr, L, and R in each drawing indicate the upper side, lower side, front side, rear side, left side, and right side of the image forming apparatus 1, respectively.

Figure 11:
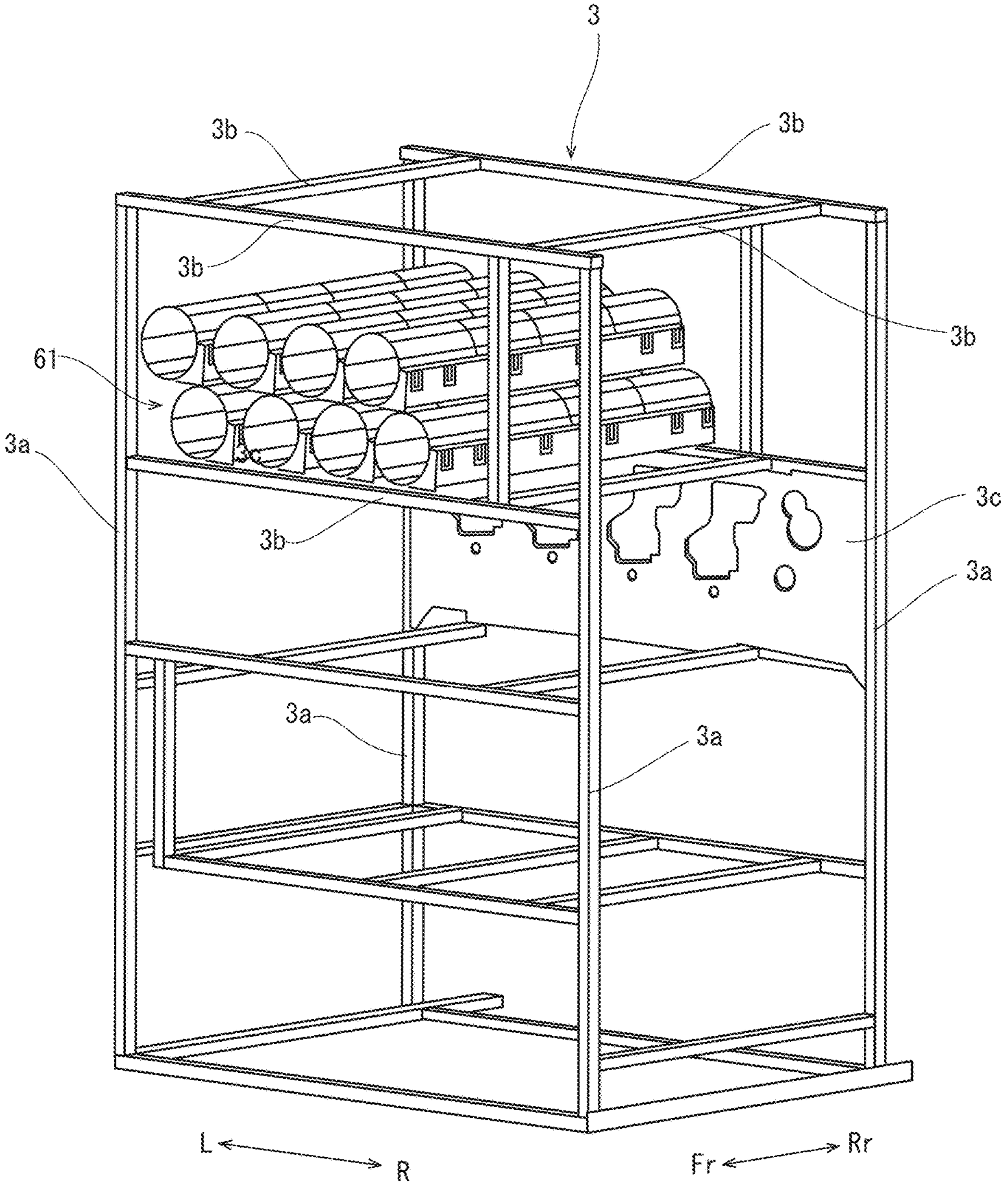
FIG. 11 is a perspective view schematically showing the container rail assembly assembled to the body frame, in the image forming apparatus according to the embodiment of the present disclosure.

The image forming apparatus 1 is provided with a main body frame 3 (see also FIG. 11) having a substantially rectangular parallelepiped appearance and forming a hollow space therein. As shown in FIG. 11, the main body frame 3 is composed of four vertical struts 3*a* arranged at four corners, a plurality of horizontal beams 3*b* arranged between the adjacent vertical struts 3*a*, side plates 3*c* covering the surfaces surrounded by the vertical struts 3*a* and the horizontal beams 3*b*, and the others. The hollow space is divided into four spaces arranged in the upper-and-lower direction by the horizontal beams 3*b*. The vertical strut 3*a* and the horizontal beam 3*b* are, for example, formed of square pipes each having openings at predetermined intervals along the longitudinal direction.

As shown in FIG. 1, the hollow space of the main body frame 3 houses a sheet feeding part 5 which feeds a sheet, an image forming part 7 which forms a toner image to be transferred to the sheet, a fixing part 9 which fixes the toner image to the sheet, and a discharge part 11 which discharges the sheet on which the toner image is fixed. The sheet feeding part 5 is housed in the lower hollow space. The image forming part 7 is disposed above the sheet feeding part 5, the fixing part 9 is disposed above the image forming part 7, and the discharge part 11 is disposed above the fixing part 9. On the upper surface of the main body frame 3, there is provided a discharge tray 13 on which the sheet discharged from the discharge part 11 is stacked.

The sheet feeding parts 5 includes a sheet feeding cassette 15 in which the sheets are stored, and a sheet feeding device 17 which feeds the sheets stored in the sheet feeding cassette 15.

The image forming part 7 includes four image forming units 21 corresponding to toner of four colors (yellow, cyan, magenta, and black), an endless intermediate transfer belt 23, four primary transfer rollers 25 corresponding to the four image forming units 21, a secondary transfer roller 27, and an exposure device 29. Each image forming unit 21 includes a rotatable photosensitive drum 31, and a charging device 33 and a developing device 35 and a cleaning device 37 which are arranged around the photosensitive drum 31. The four image forming units 21 are arranged side by side in the left-and-right direction.

The intermediate transfer belt 23 is disposed above the four image forming units 21, is wound between a driving roller and a driven roller spaced apart from each other in the left-and-right direction, and travels in the counterclockwise direction indicated by the arrows in FIG. 1. The outer surface of the lower track of the intermediate transfer belt 23 faces the photosensitive drums 31 of the four image forming units 21, and forms primary transfer nips between the photosensitive drums 31 and the intermediate transfer belt 23. The four primary transfer rollers 25 are disposed in the inner space of the intermediate transfer belt 23, and face the photosensitive drums 31 of the four image forming units 21 at the primary transfer nips. The secondary transfer roller 27 faces the driving roller across the intermediate transfer belt 23, and forms a secondary transfer nip between the secondary transfer roller 27 and the intermediate transfer belt 23.

The fixing part 9 includes a heating roller and a pressure roller, and a fixing nip is formed between both rollers. The discharge part 11 includes a discharge rollers pair.

Further, in the hollow space, a sheet conveyance path 41 is formed from the sheet feeding device 17 of the sheet feeding part 5 to the discharge part 11 through the secondary transfer nip and the fixing nip. On the conveyance path 41, a registration rollers pair 43 is provided on the upstream side of the secondary transfer nip in the sheet conveyance direction.

The image forming operation will be briefly described. In each image forming unit 21 of the image forming part 7, the charging device 33 charges the photosensitive drum 31 to a predetermined potential. Thereafter, the photosensitive drum 31 is exposed by the exposure device 29 based on image data to form an electrostatic latent image. The electrostatic latent image is developed into a toner image by the developing device 35. At the primary transfer nip, the toner image is transferred from the photosensitive drum 31 to the intermediate transfer belt 23 by the primary transfer roller 25 to which a transfer bias is applied. In the four image forming units 21, the toner images are respectively transferred to the intermediate transfer belt 23, thereby forming a full-color toner image on the intermediate transfer belt 23.

On the other hand, in the sheet feeding part 5, the sheet is fed from the sheet feeding cassette 15 to the conveyance path 41 by the sheet feeding device 17. The sheet is conveyed along the conveyance path 41, and after the skew is corrected by the registration rollers pair 43, the sheet is conveyed to the secondary transfer nip. At the secondary transfer nip, the full-color toner image is transferred from the intermediate transfer belt 23 to the sheet by the secondary transfer roller 27 to which a transfer bias is applied. Thereafter, the sheet is conveyed to the fixing part 9, and the toner image is heated and pressurized at the fixing nip to be fixed to the sheet. The sheet is conveyed to the discharge part 11, and discharged to the discharge tray 13 by the discharge rollers pair.

As shown in FIG. 1, a container housing 51 is housed above the image forming part 7. As shown in FIG. 11, the container housing 51 is housed in the uppermost hollow space of the main body frame 3, which is divided by the horizontal beams 3*b*. As shown in FIG. 1, the container housing 51 houses an upper container group 53A and a lower container group 53B each including four toner containers 53 containing the toner of the four colors. Each toner container 53 of the upper and lower container groups 53A, 53B supplies the toner to the developing device 35 of the corresponding color. Thus, two toner containers 53 are provided for each color of the toner. Therefore, as described above, even when the toner container 53 of one container group becomes empty, the toner can be supplied from the toner container 53 of the other container group, so that the stop time of the image forming apparatus the 1 accompanying replacement of the toner container can be shortened.

Figure 2:
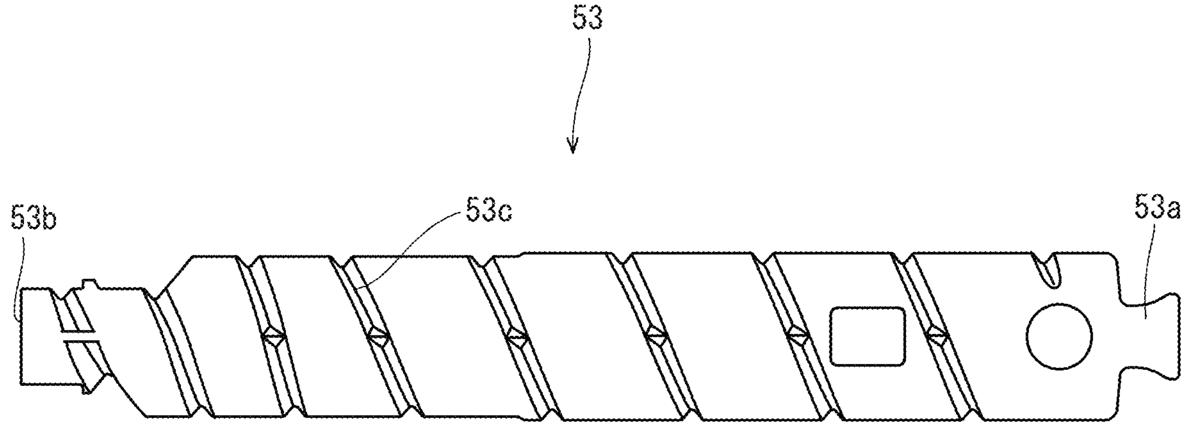
FIG. 2 is a side view showing a toner container in the image forming apparatus according to the embodiment of the present disclosure.

Next, with reference to FIG. 2, the toner container 53 will be described. FIG. 2 is a side view showing the toner container 53. The toner container 53 is formed in a cylindrical shape having a hollow space for storing the toner. A protrusion 53*a* having a small diameter is provided on one longitudinal end surface of the toner container, and a discharge port 53*b* is provided on the other longitudinal end surface. A spiral protrusions 53*c* extending in the longitudinal direction is formed on the inner circumferential surface of the toner container 53.

The toner containers 53 for storing the yellow, cyan and magenta toners has the same shape and the same capacity, and the toner container 53 for storing the black toner has a larger capacity than those toner containers 53. The four toner containers 53 storing the toners of the four colors constitute one container group.

Figure 3A:
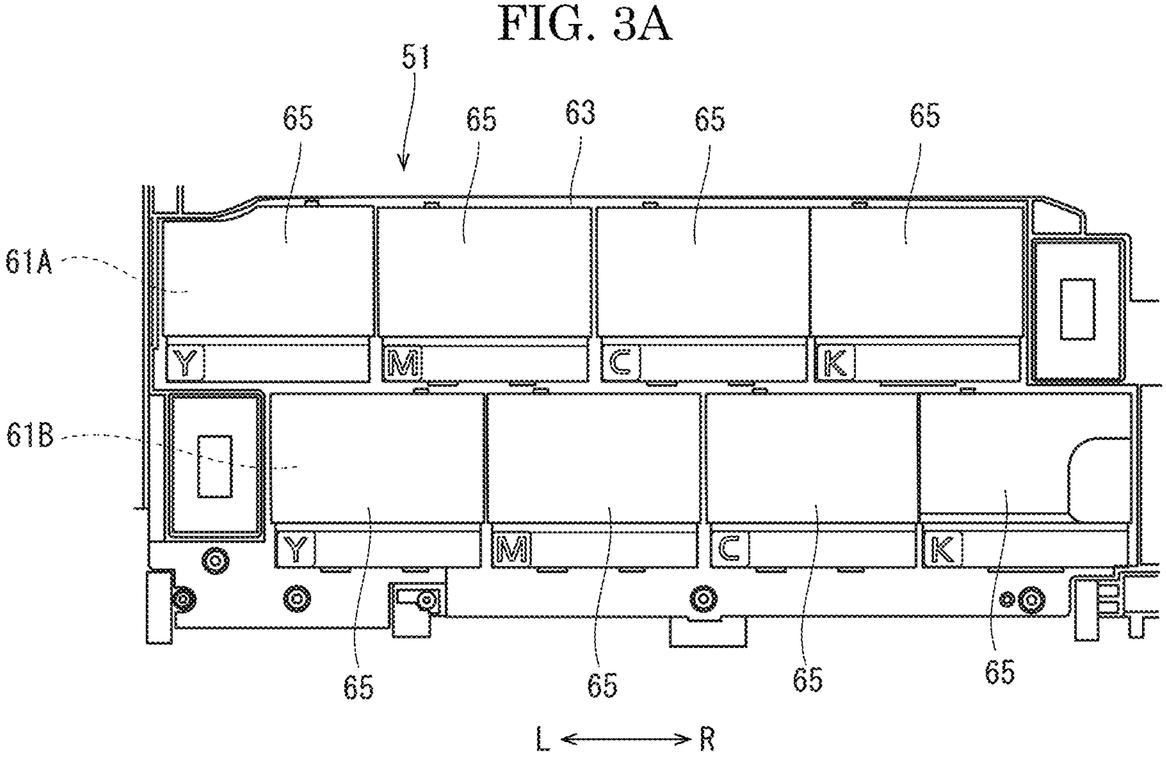
FIG. 3A is a front view showing a container housing (in a state where covers are turned in a close posture) assembled to a main body frame, in the image forming apparatus according to the embodiment of the present disclosure.
Figure 3B:
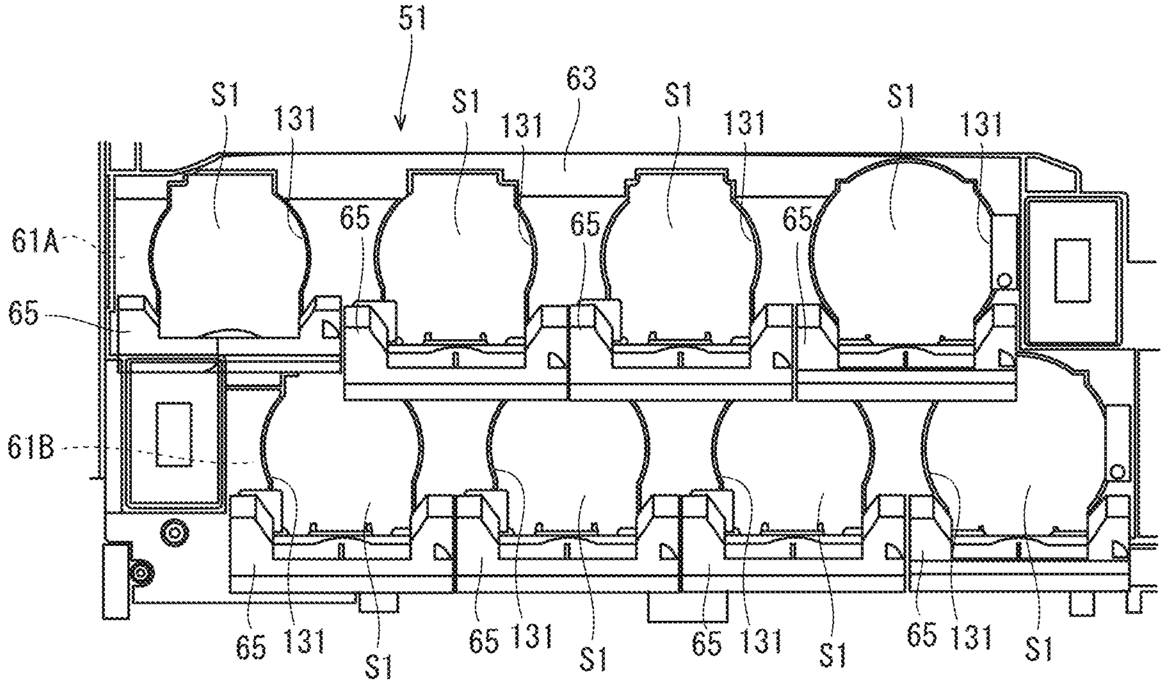
FIG. 3B is a front view showing the container housing (in a state where the covers are turned in an open posture) assembled to the main body frame, in the image forming apparatus according to the embodiment of the present disclosure.

Next, with reference to FIG. 3A and FIG. 3B, the container housing 51 will be described. FIG. 3A and FIG. 3B are front views showing the container housing 51 housed in the hollow space of the main body frame 3 and assembled to the main body frame 3. The container housing 51 includes an upper container rail assembly 61B, a lower container rail assembly 61B, an opening frame 63, covers 65, and locking mechanisms 67 (not shown in FIG. 3A and FIG. 3B, see FIG. 9 and FIG. 10). The upper container rail assembly 61A houses the upper container group 53A. The lower container rail assembly 61B houses the lower container group 53B. The opening frame 63 has openings 131 (see FIG. 3B) through which the toner containers 53 of both container groups 53A, 53B are attached and detached. The cover 65 opens and closes the opening 131 of the opening frame 63. The locking mechanism 67 locks the cover 65 in a close posture for closing the opening 131.

Figure 4:
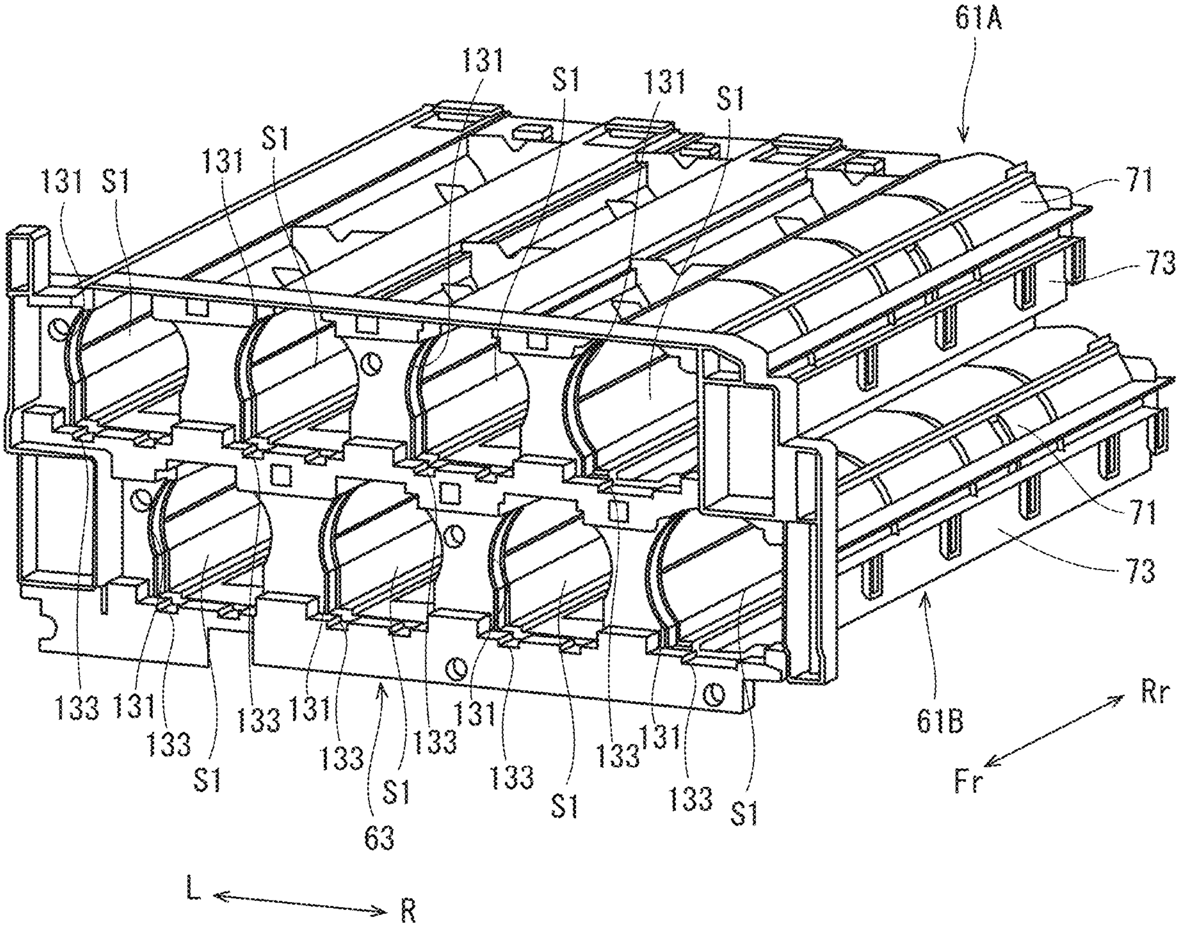
FIG. 4 is a perspective view showing the container housing (the covers not shown) in the image forming apparatus according to the embodiment of the present disclosure.

First, with reference to FIG. 4, the upper container rail assembly 61A, the lower container rail assembly 61B, and the opening frame 63 will be described. FIG. 4 is a perspective view showing the upper container rail assembly 61A, the lower container rail assembly 61B, and the opening frame 63. The upper and lower container rail assemblies 61A and 61B (collectively referred to as the container rail assembly 61) have the same structure.

Figure 5A:
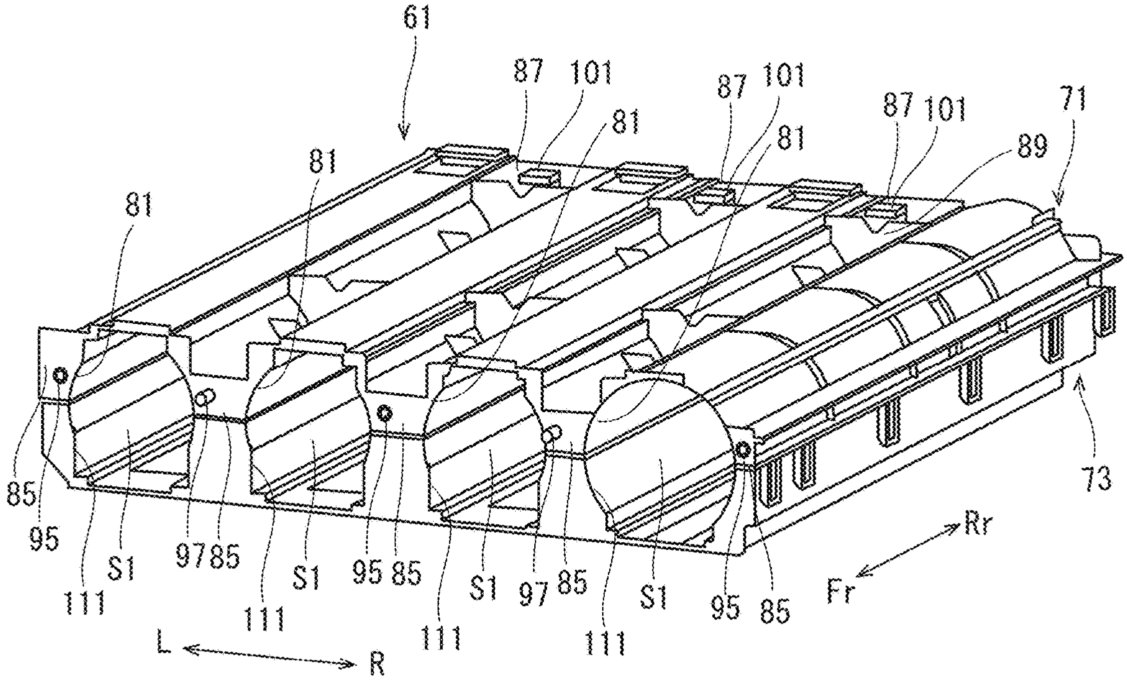
FIG. 5A is a perspective view showing a container rail assembly in the imaging apparatus according to the embodiment of the present disclosure.
Figure 5B:
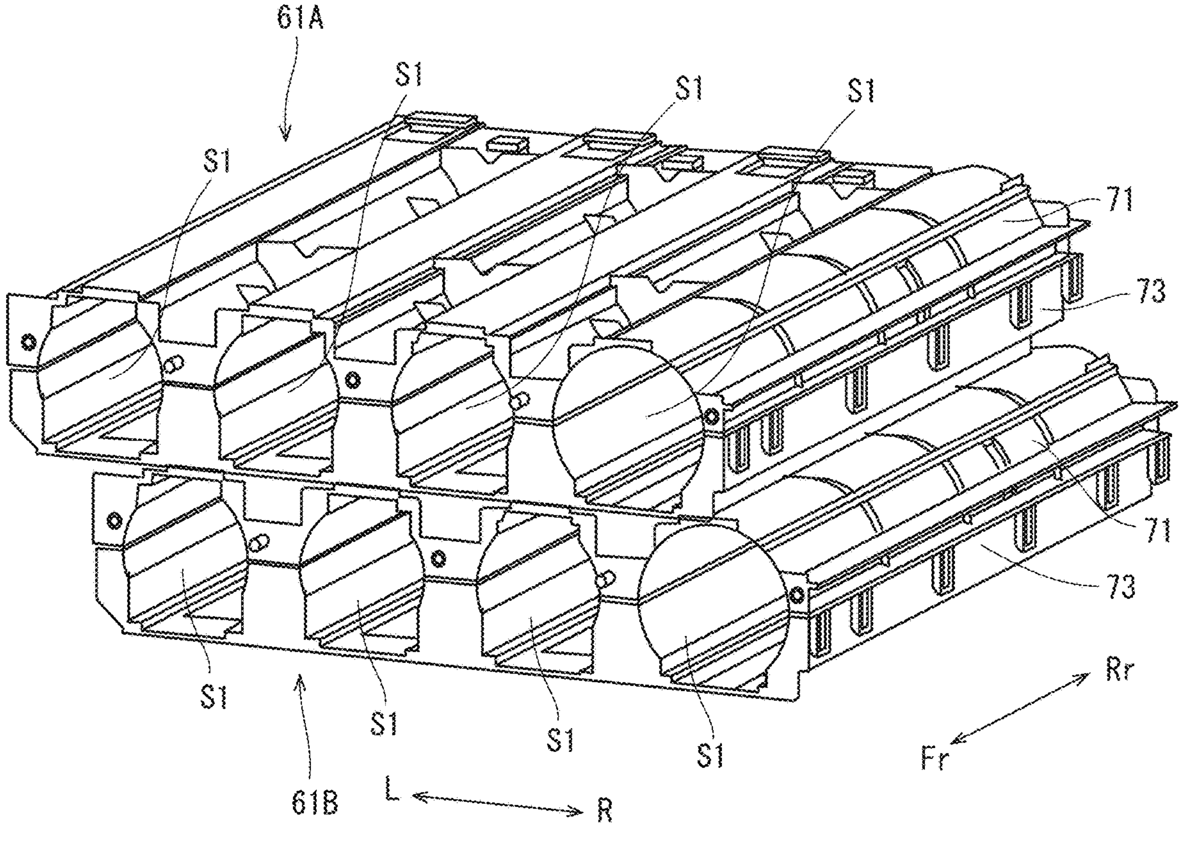
FIG. 5B is a perspective view showing an upper and lower container rail assemblies in the imaging apparatus according to the embodiment of the present disclosure.
Figure 6A:
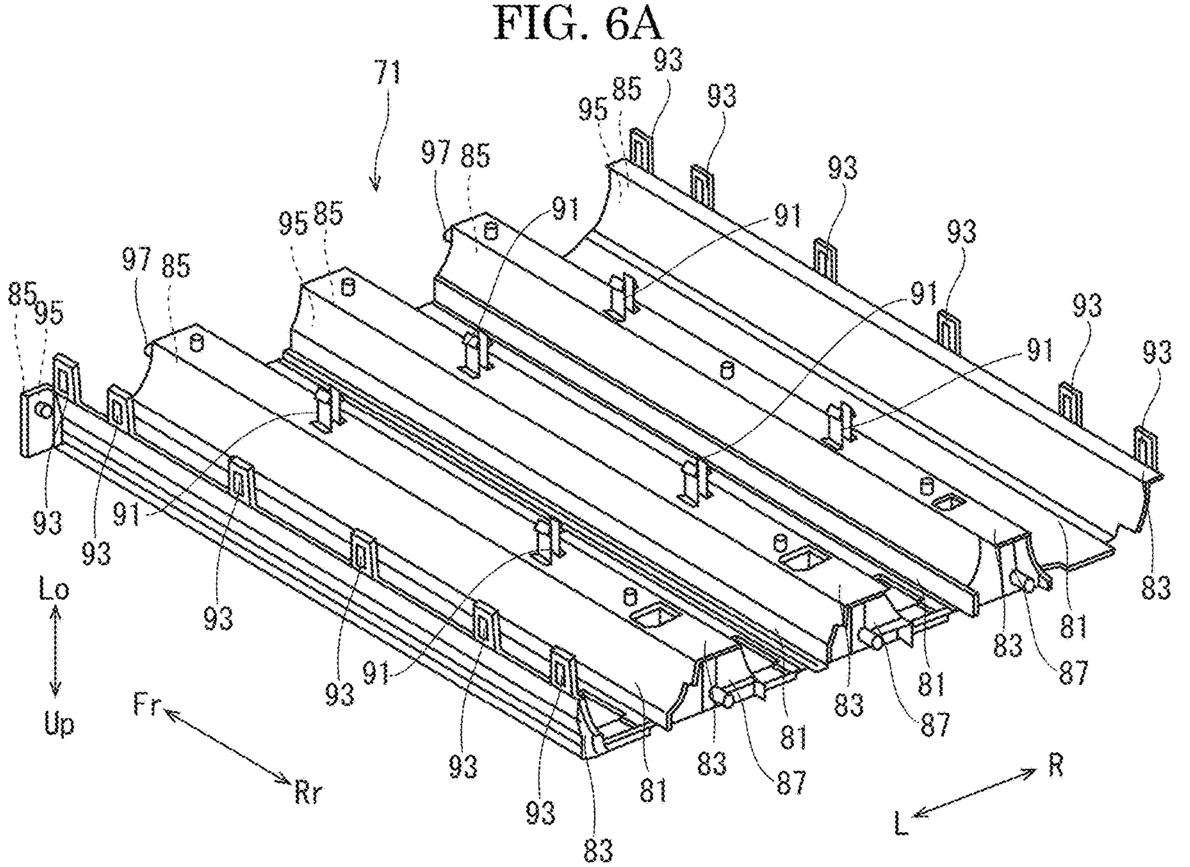
FIG. 6A is a perspective view showing an upper rail (upside-down posture) in the image forming apparatus according to the embodiment of the present disclosure.
Figure 6B:
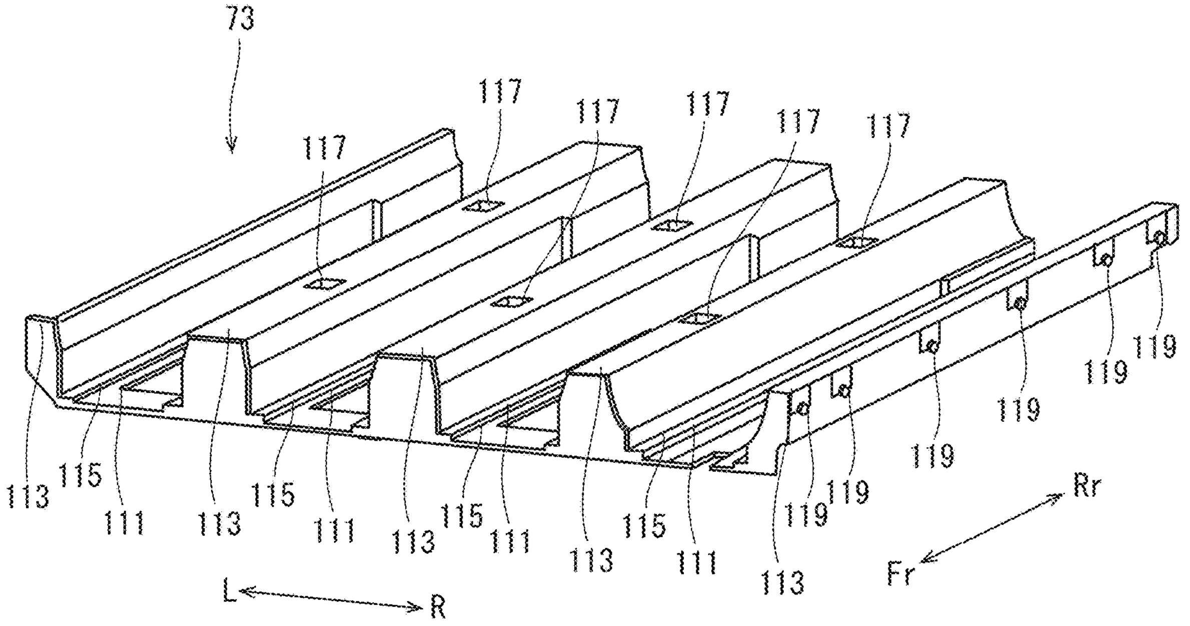
FIG. 6B is a perspective view showing a lower rail in the image forming apparatus according to the embodiment of the present disclosure.

With reference also to FIG. 5A and FIG. 5B, and FIG. 6A and FIG. 6B, the container rail assembly 61 will be described. FIG. 5A is a perspective view showing the container rail assembly 61, and FIG. 5B is a perspective view showing the upper and lower container rail assemblies 61A, 61B. FIG. 6A is a perspective view showing an upper rail 71, and FIG. 6B is a perspective view showing a lower rail 73. The container rail assembly 61 houses the four toner containers 53 of each container group side by side in the left-and-right direction. The container rail assembly 61 includes an upper rail 71 and a lower rail 73.

First, with reference to FIG. 6A, the upper rail 71 will be described. FIG. 6A shows the upper rail 71 upside-down. The upper rail 71 has four upwardly concave recesses 81 and five downwardly convex protrusions 83 formed alternately in the left-and-right direction. The upwardly concave recess 81 is formed to be long in the front-and-rear direction so as to house the upper half of the toner container 53. Like the upwardly concave recess 81, the downwardly convex protrusion 83 is formed to be long in the front-and-rear direction. A front plate 85 is provided at the front end of the downwardly convex protrusion 83. A rear plate 87 is provided at the rear end of each of the three central downwardly convex protrusions 83. Further, a plurality of rib plates 89 (see FIG. 5A) are provided between the front plate 85 and the rear plate 87.

On the lower surface of the bottom of each of the three central downwardly convex protrusions 83 has two hooks 91. The two hooks 91 are spaced at an interval in the front-and-rear direction. Each hook 91 has two elastic pieces projecting downwardly from the lower surface. The two elastic pieces are spaced away in the left-and-right direction. A claw is formed on the outer surface of the distal end of the elastic piece. Each of the outer two downwardly convex protrusions 83 has six elastic pieces 93 at intervals in the front-and-rear direction. The six elastic pieces 93 hang down from the outer side edges of the two outer downwardly convex protrusions 83. Each elastic piece 93 is formed with a long hole extending in the upper-and-lower direction.

As also shown in FIG. 5A, the five front plates 85 each has three circular holes 95 and two cylindrical pins 97 alternately formed along the front-and-rear direction.

Next, with reference to FIG. 6B, the lower rail 73 will be described. The lower rail 73 has four downwardly concave recesses 111 and five upwardly convex protrusions 113 formed alternately in the left-and-right direction. The upwardly concave recess 111 is formed to be long in the front-and-rear direction so as to house the lower half of the toner container 53. A rail 115 extending in the front-and-rear direction for guiding the toner container 53 is formed on the inner surface of the downwardly concave recess 111. Like the downwardly concave recess 111, the upwardly convex protrusion 113 is formed to be long in the front-and-rear direction.

On the upper surface of the top of the central three upwardly convex protrusions 113 has two rectangular openings 117 spaced at an interval in the front-and-rear direction. The outer two upwardly convex protrusion 113 have six protrusions 119 protruding outwardly at intervals in the front-and-rear direction. The six protrusions 119 are arranged along the edge of the outer surface of each of the outer upwardly convex protrusions 113.

Next, a procedure for assembling the upper rail 71 and the lower rail 73 will be described. The lower surfaces of the tops of the downwardly convex protrusions 83 of the upper rail 71 is opposed to the upper surfaces of the t tops of the upwardly convex protrusions 113 of the lower rail 73, and the hooks 91 of the upper rail 71 are inserted into the openings 117 of the lower rail 73. Then, the claws of the two elastic pieces of each hook 91 abut against the edges of each opening 117, and the two elastic pieces are pushed inward to be elastically deformed. The two elastic pieces are inserted into the openings 117 while being elastically deformed, and when the claws are separated from the edges of the opening 117, the two elastic pieces are elastically restored, and the claws are locked to the edges the opening 117. At the same time, the protrusion 119 of the lower rail 73 enters the long hole of the elastic piece 93 of the upper rail 71. The hook 91 and the elastic piece 93 of the upper rail 71 are examples of the upper engagement structure in the present disclosure, and the opening 117 and protrusion 119 of the lower rail 73 are examples of the lower engagement structure in the present disclosure.

As described above, the hooks 91 and the elastic pieces 93 of the upper rail 71 are respectively engaged with the openings 117 and the protrusions 119 of the lower rail 73, whereby the upper and lower rails 71 and 73 are assembled into the container rail assembly 61 (see FIG. 5A). In the container rail assembly 61 thus assembled, four substantially cylindrical container housing spaces S1 arranged in the left-and-right direction are formed by the four upwardly concave recesses 81 of the upper rail 71 and the four downwardly concave recesses 111 of the lower rail 73. The four toner containers 53 of the container group are housed in the four container housing spaces S1.

Further, the upper rail 71 and the lower rail 73 may be fastened using screws or the like.

Figure 7A:
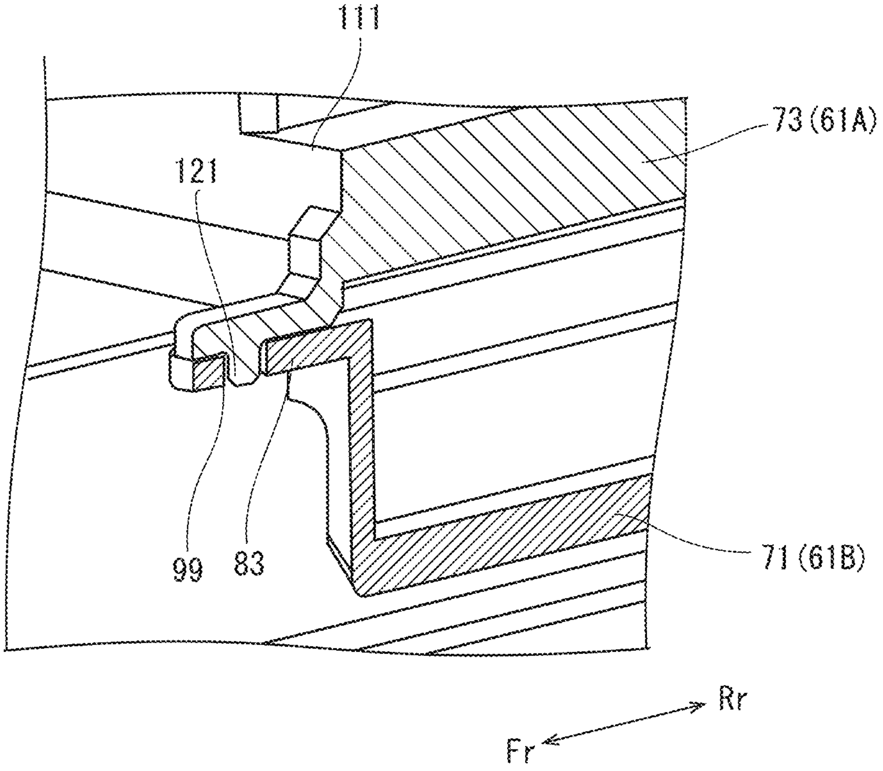
FIG. 7A is a cross-sectional perspective view showing a front connection structure between the upper container rail assembly and the lower container rail assembly, in the image forming apparatus according to the embodiment of the present disclosure.
Figure 7B:
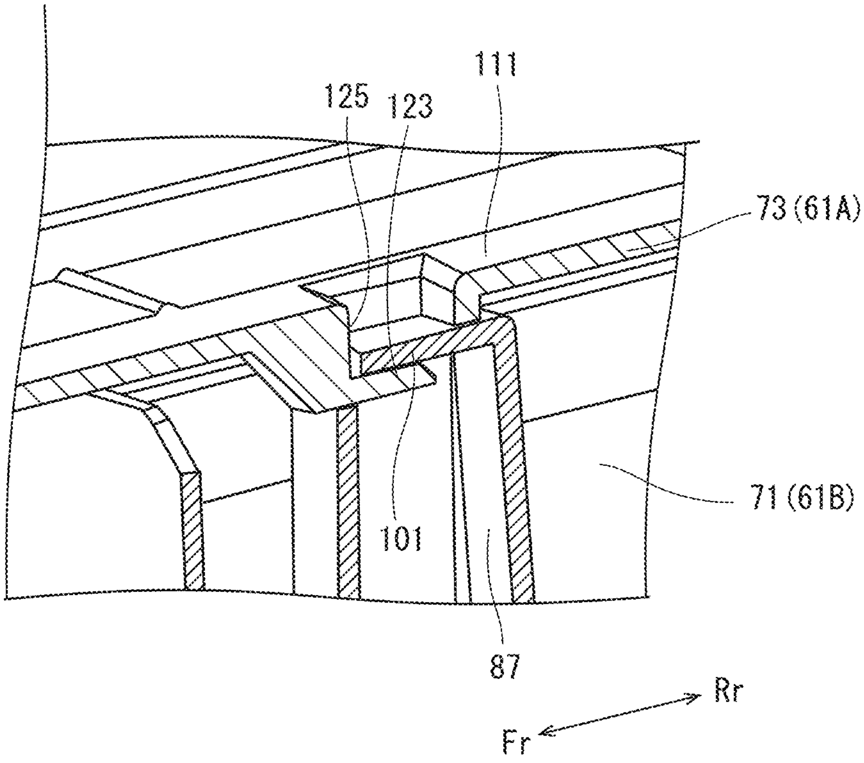
FIG. 7B is a cross-sectional perspective view showing a rear connection structure between the upper container rail assembly and the lower container rail assembly, in the image forming apparatus according to the embodiment of the present disclosure.

Next, with reference to FIG. 7A and FIG. 7B, front and rear connection structures connecting the two container rail assemblies 61 in the upper-and-lower direction will be described. FIG. 7A is a sectional perspective view showing the front connection structure, and FIG. 7B is a sectional perspective view showing the rear connection structure.

First, with reference to FIG. 7A, the front connection structure will be described. The front connection structure includes a through-hole 99 and a pin 121. The through-hole 99 penetrates the front end portion of the top of the downwardly convex protrusion 83 of the upper rail 71 in the upper-and-lower direction. The pin 121 is protruded downwardly from the front end portion of the bottom of the downwardly concave recess 111 of the lower rail 73.

Next, with reference to FIG. 7B, the rear connection structure will be described. The rear connection structure includes an upper locking piece 101 (see also FIG. 5A) and a lower locking piece 123. The upper locking piece 101 is protruded forwardly from the rear plate 87 of the upper rail 71. The lower locking piece 123 is protruded rearwardly from the rear end portion of the bottom of the downwardly concave recess 111 of the lower rail 73. A rectangular opening 125 is formed at the rear end portion of the bottom of the downwardly concave recess 111 of the lower rail 73. The lower locking piece 123 extends downwardly from the front edge of the opening 125 and then extends rearwardly.

In the front connection structure, the pin 121 of the lower rail 73 of the upper container rail assembly 61A is inserted into the through-hole 99 of the upper rail 71 of the lower container rail assembly 61B, whereby the upper container rail assembly 61A and the lower container rail assembly 61B are positioned in the front-and-rear direction and in the left-and-right direction.

In the rear connection structure, the lower locking piece 123 of the lower rail 73 of the upper container rail assembly 61A is engaged with the upper locking piece 101 of the upper rail 71 of the lower container rail assembly 61B in the upper-and-lower direction, whereby the upper container rail assembly 61A and the lower container rail assembly 61B are positioned in the upper-and-lower direction by engaging When the two container rail assemblies 61 (see FIG. 5A) are connected in the upper-and-lower direction in the above manner (see FIG. 5B), the four container housing spaces S1 of the lower container rail assembly 61B and the four container housing spaces S1 of the upper container rail assembly 61A are arranged so as to be shifted (staggered) in the left-and-right direction.

Figure 8:
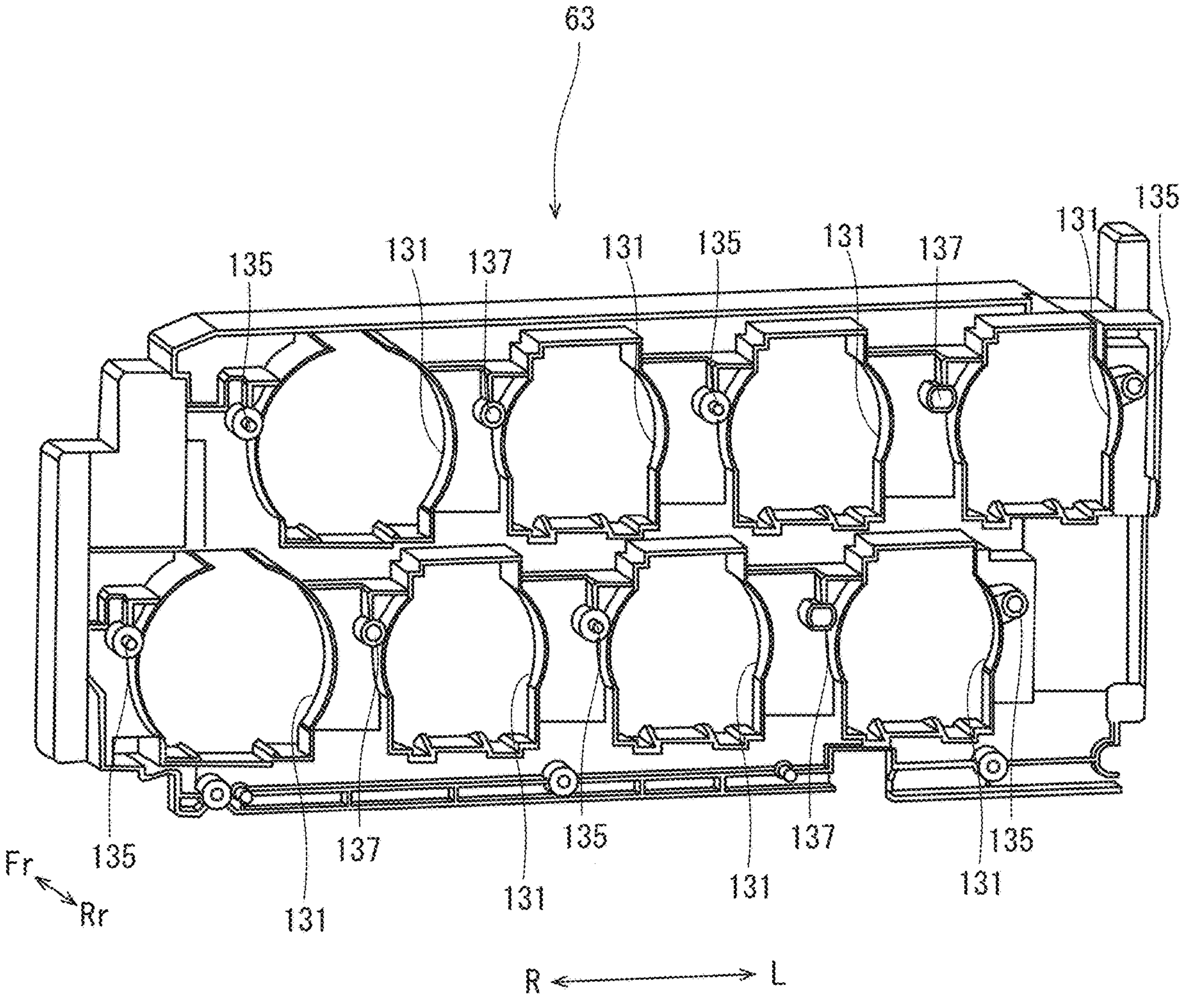
FIG. 8 is a perspective view showing an opening frame, as viewed from the rear side, in the image forming apparatus according to the embodiment of the present disclosure.

Next, with reference to FIG. 4 and FIG. 8, the opening frame 63 will be described. FIG. 8 is a perspective view showing the opening frame 63 viewed from the rear side. The opening a frame 63 is rectangular plate-like member that is long in the left-and-right direction, and has a front plate and a side plate formed along the periphery of the front plate. The front plate has eight openings 131 corresponding to the eight container housing spaces S1 of the two container rail assemblies 61 (see FIG. 5B) connected in the upper-and-lower direction. That is, the front plate has the four openings 131 arranged in the left-and-right direction and communicating with the four container housing spaces S1 of the upper container rail assembly 61A, and the four openings 131 arranged in the left-and-right direction and communicating with the four container housing spaces S1 of the lower container rail assembly 61B, which are shifted in the left-and-right direction.

As shown in FIG. 4, on the front surface of the front plate, a bearing portion 133 extending in the left-and-right direction is formed below each opening 131. Further, as shown in FIG. 8, on the rear surface of the front plate, three pins 135 and two holes 137 are alternately formed between the openings 131 adjacent to each other in the left-and-right direction and on the outside of the outermost openings 131.

Next, a procedure for connecting the upper and lower container rail assemblies 61A and 61B (hereinafter, simply referred to as the container rail assembly 61) to the opening frame 63 will be described. The openings of the container housing spaces S1 of the upper and lower container rail assemblies 61A and 61B (see FIG. 5B) assembled as described above face the openings 131 of the opening frame 63. Then, the front end surface of the container rail assembly 61 is brought into contact with the rear surface of the front plate of the opening frame 63 inside the side plate of the opening frame 63. Thus, the pins 97 (see FIG. 5A) formed in the front plates 85 of the upper rail 71 of the upper and lower container rail assemblies 61 are inserted into the holes 137 (see FIG. 8) of the opening frame 63, and the pins 135 (see FIG. 8) of the opening frame 63 are inserted into the holes 95 (see FIG. 5A) formed in the front plates 85 of the upper rail 71. As a result, the container rail assembly 61 is assembled to the opening frame 63 (see FIG. 4). The container rail assembly 61 and the opening frame 63 may be fastened by screws.

Figure 9:
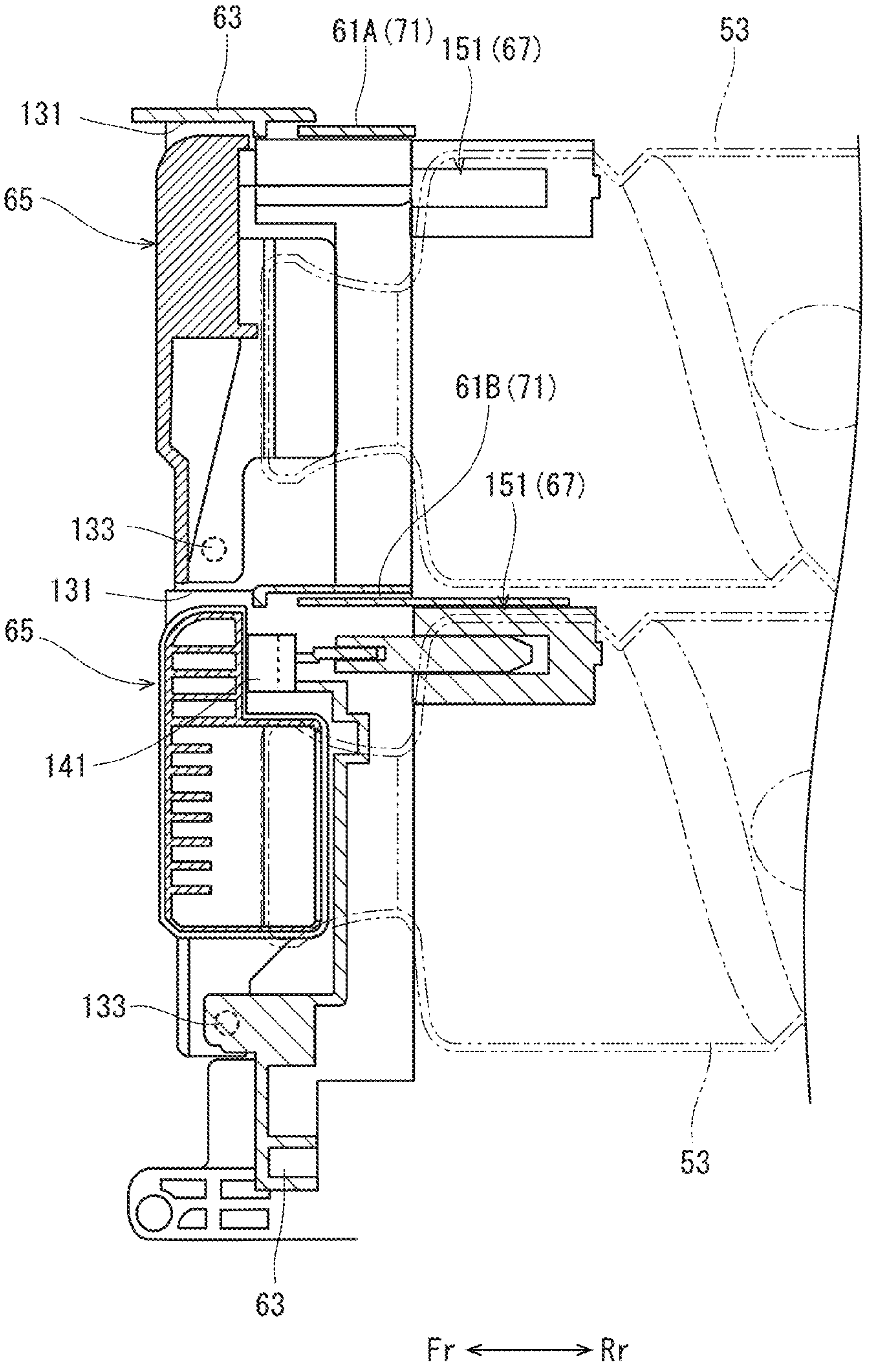
FIG. 9 is a side sectional view showing the container housing (a state in which the covers are turned in a close posture), in the image forming apparatus according to the embodiment of the present disclosure.

Next, the cover 65 will be described with reference to FIG. 3A and FIG. 3B, and FIG. 9. FIG. 3A shows the covers 65 turned in a close posture, and FIG. 3B shows the covers 65 turned in an open posture. FIG. 9 is a side sectional view showing the cover 65.

As shown in FIG. 3A, the cover 65 has a rectangular shape of a size capable of closing the opening 131 of the opening frame 63. A mark indicating the color of the corresponding toner is marked on the outer surface of the cover 65. As shown in FIG. 9, a hook 141 protruding inward is formed on the inner surface of the cover 65.

The cover 65 is rotatably supported by the bearing portion 133 (see also FIG. 4) provided below the opening 131 of the opening frame 63, and turned in the upper-and-lower direction between a close posture (see FIG. 3A and FIG. 9) for closing the opening 131 and an open posture (see FIG. 3B) for opening the opening 131.

Figure 10:
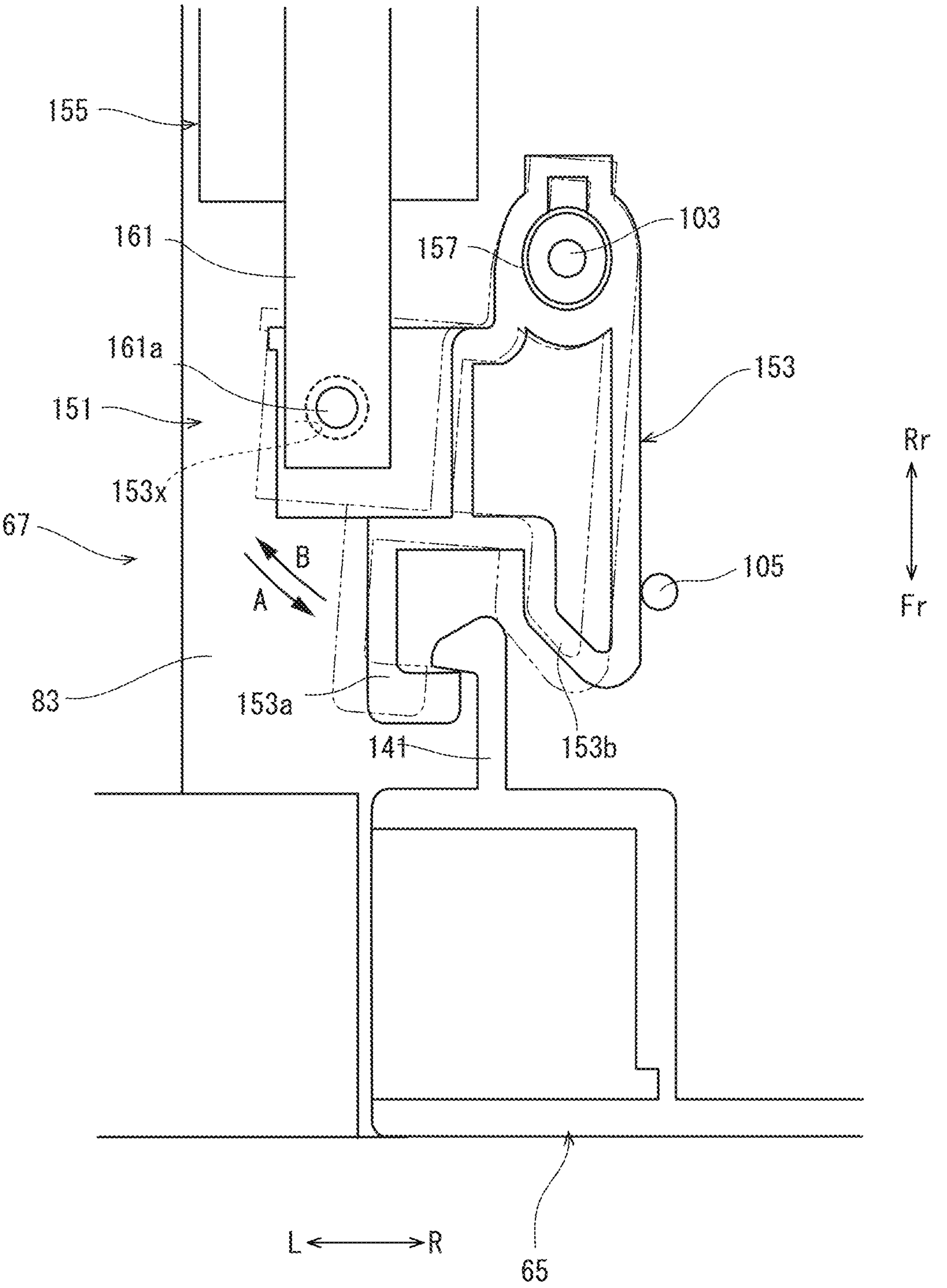
FIG. 10 is a plan view showing a cover locking device, in the image forming apparatus according to the embodiment of the present disclosure.

Next, the locking mechanism 67 for fixing the cover 65 in the close posture will be described with reference to FIG. 9 and FIG. 10. FIG. 10 is a plan view showing the locking mechanism 67.

The locking mechanism 67 includes the hook 141 provided on the cover 65 and a locking device 151 (see FIG. 10) housed in the downwardly convex protrusion 83 of the upper rail 71 of the container rail assembly 61. As shown in FIG. 10, the locking device 151 includes a hook member 153 which is rotated to be engageable with the hook 141 of the cover 65, and a solenoid 155 which rotates the hook member 153.

First, the hook member 153 will be described. The hook member 153 is rotatably supported by a rotational shaft 103 provided in the downwardly convex protrusion 83 of the upper rail 71 and extending in the upper-and-lower direction. A hook piece 153*a* and a pressing piece 153*b* are provided at the free end of the hook member 153. The hook piece 153*a* and the pressing piece 153*b* are arranged at a predetermined interval along a rotation locus around the rotational shaft 103. The hook member 153 is biased by a torsion coil spring 157 provided on the rotational shaft 103 such that the hook piece 153*a* rotates in an engaging direction A engaging with the hook 141 of the cover 65. The rotation of the hook piece 153*a* in the engaging direction A is restricted by a pin 105 provided in the downwardly convex protrusion 83 of the upper rail 71.

When the hook member 153 is biased by the torsion coil spring 157 and rotated in the engaging direction A, the hook piece 153*a* can be engaged with the hook 141 of the cover 65. On the other hand, when the hook member 153 is rotated in a release direction B opposite to the engaging direction A (see the two-dot chain line in FIG. 10), the engagement between the hook piece 153*a* and the hook 141 is released, and the hook 141 is pressed by the pressing piece 153*b* to bias the cover 65 to turn to the open posture.

Next, the solenoid 155 will be described. The solenoid 155 has a movable element 161 movable forwardly and rearwardly. The distal end of the movable element 161 is rotatably connected to the hook member 153. Specifically, a shaft 161*a* is provided at the distal end of the movable element 161, and an opening 153*x* into which the shaft 161*a* is inserted is formed in the hook member 153. A diameter of the opening 153*x* is larger than a diameter of the shaft 161*a*. When the movable element 161 moves forward and rearward, the hook member 153 rotates around the rotational shaft 103 via the shaft 161*a* and the opening 153*x*. More specifically, when the movable element 161 is moved forwardly, the hook member 153 is turned in the engaging direction A, and when the movable element 161 is moved rearwardly, the hook member 153 is turned in the release direction B.

The solenoid 155 is electrically connected to the control part (not shown). The solenoid 155 is switched between an energized state and a non-energized state by the control part.

Further, the locking mechanism 67 includes an opening/closing detection switch (not shown) for detecting that the cover 65 is turned to the close posture. The opening/closing detection switch is electrically connected to the control part.

Next, a positioning structure of the container housing 51 with respect to the main body frame 3 will be described with reference to FIG. 11 and FIG. 12. FIG. 11 is a perspective view showing the container rail assembly 61 assembled to the main body frame 3, and FIG. 12 is a sectional perspective view showing the positioning structure between the main body frame 3 and the container rail assembly 61.

As described above, the container housing 51 is housed in the uppermost hollow space of the main body frame 3 and assembled to the main body frame 3.

Figure 12:
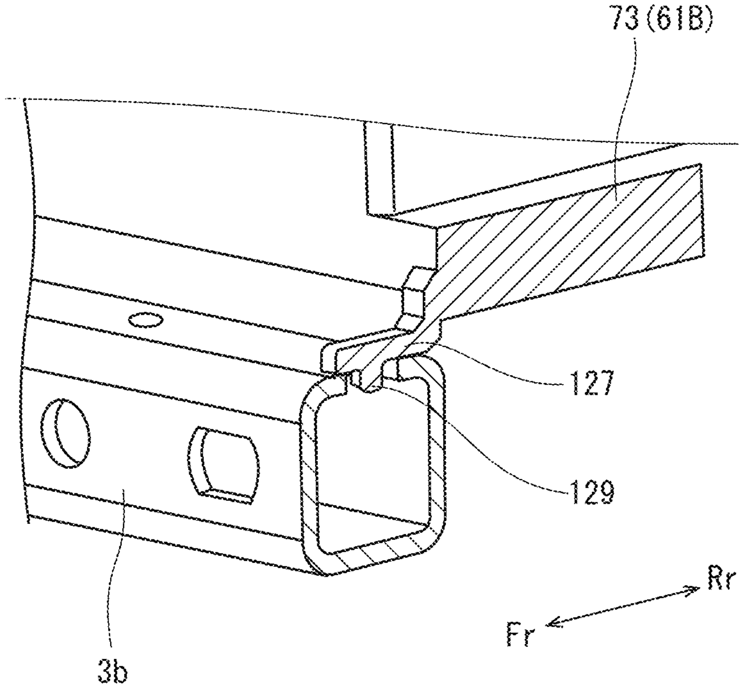
FIG. 12 is a cross-sectional perspective view showing a positioning structure between the body frame and the container rail assembly, in the image forming apparatus according to the embodiment of the present disclosure.

As shown in FIG. 12, a support piece 127 is protruded forward from the lower end portion of the lower rail 73 of the lower container rail assembly 61B. Pins 129 protrude from the lower surface of the support piece 127 at predetermined intervals in the left-and-right direction.

The container housing 51 is housed in the hollow space of the main body frame 3, and the pins 129 of the container rail assembly 61 are inserted into the predetermined openings of the horizontal beam 3*b* of the main body frame 3, so that the front end portion of the container rail assembly 61 is positioned relative to the main body frame 3 in the left-and-right direction and in the front-and-rear direction. As described above, the pins 129 of the container rail assembly (the lower rail 73) and the horizontal beam 3*b* of the main body frame 3 are examples of the positioning structure of the container housing 51 with respect to the main body frame 3 in the present disclosure.

When the front end portion of the container rail assembly 61 (the container housing 51) is positioned with respect to the main body frame 3 in this manner (see FIG. 11), the rear end portion of the container rail assembly 61 is connected to a toner replenishment unit (not shown) supported by the main body frame 3. The toner replenishment unit includes a rotating mechanism for rotating the toner container 53, a pipe extending in the upper-and-lower direction for replenishing the toner to the developing device 35, and a toner sensor 171 (see FIG. 1) for detecting that the toner container 53 has become empty.

The pipe is formed of a transparent material. The toner sensor 171 is a magnetic permeability sensor, and detects the presence or absence of the toner in the pipe. The toner sensor 171 is electrically connected to the control part. A detection result of the toner sensor 171 is transmitted to the control part.

The container housing 51 having the above configuration is positioned with respect to the main body frame 3 as described above (see FIG. 11). That is, the front end portion of the container housing 51 (the lower rail 73 of the lower container rail assembly 61B) is positioned to the horizontal beam 3*b* of the main body frame 3, and the rear end portion is connected to the toner replenishment mechanism.

The toner container 53 (see FIG. 2) is housed in the corresponding container housing space S1 of the container housing 51 along an attaching/detaching direction along the front-and-rear direction with the longitudinal end surface having the discharge port 53*b* facing forward (the rear side). At this time, the toner container 53 is guided along the rail 115 (see FIG. 6B) of the lower rail 73. When the toner container 53 is housed in the container housing space S1, the toner container 53 is coupled to the rotating mechanism of the toner replenishment mechanism.

In addition, a memory chip (not shown) storing various information is attached to each toner container 53, and when the toner container 53 is housed in the container housing space S1 and coupled to the rotating mechanism, various information is read from the memory chip and transmitted to the control part upon the detection of the coupling. The control part stores the detection result of the toner sensor 171 in association with the various information read from the toner container 53.

After the toner container 53 is housed in the container housing space S1, the cover 65 is turned from the open posture to the close posture. Then, the opening/closing detection switch is turned on.

Thus, the control part drives the rotating mechanism to rotate the toner container 53. Then, the contained toner is conveyed toward the discharge port 53*b* by the spiral protrusion 53*c*. The toner is discharged from the discharge port 53*b* to the pipe, and supplied to the predetermined developing device 35 through the pipe.

As described above, the container housing 51 of the present disclosure can easily house the containers 53 of the upper and lower containers groups 53A, 53B at appropriate positions. The upper container housing spaces S1 and the lower container housing spaces S2 are shifted in the left-and-right direction by the distance between the adjacent openings 131 of the opening frame 63 in the left-and-right direction. By arranging in this manner, it becomes possible to minimize the length in the upper-and-lower direction (the height) of the container housing 51 while minimizing the length in the left-and-right direction (the width), and the main body frame 3 can be downsized.

In addition, in the toner replenishment mechanism, the pipe corresponding to each toner container 53 of the upper container group 53A can be arranged between the pipes corresponding to the adjacent toner containers 53 of the lower containers group 53B.

In addition, the upper rail 71 and the lower rail 73 are easily connected by engaging the upper engagement structure (the hook 91, the elastic piece 93) and the lower engagement structure (the opening 117, the protrusion 119). Further, the upper and lower container rail assemblies 61A and 61B can be easily positioned in the upper-and-lower direction, in the left-and-right direction and in the front-and rear direction using the front connection structure (the through-hole 99, the pin 121) and the rear connection structure (the upper locking piece 101, the lower locking piece 123). Furthermore, by forming the horizontal beam 3*b* of the main body frame 3 with the square pipe having the openings, the container rail assembly 61 can be easily attached to the main body frame using the opening.

In addition, the locking device 151 for locking the cover 65 in the close posture is housed in the downwardly convex protrusion 83 of the upper rail 71, so that the space in the downwardly convex protrusion 83 can be efficiently used.

The container housing 51 may be configured to house three or more container groups.

While specific embodiments of the present disclosure are described, the present disclosure is not limited to these embodiments. Those skills in the art can modify the described embodiments without departing from the scope and spirit of the present disclosure.

The invention claimed is:

1. An image forming apparatus comprising:

a plurality of container groups in which a plurality of toner containers containing toner of different colors are arranged side by side in a left-and-right directions; and a container housing which houses the container groups arranged in an upper-and-lower direction, the toner containers of the container groups arranged in the upper-and-lower direction being shifted in the left-and-right direction, wherein the container housing includes:

a lower rail which houses lower halves of the toner containers of the container group; and an upper rail which houses upper halves of the toner containers of the container group and is connectable to the lower rail; and an opening frame which has openings to and from which the toner containers are attached and detached, and a container rail assembly in which the lower rail and the upper rail are connected is assembled to the opening frame.

2. The image forming apparatus according to claim 1, wherein the lower rail has downwardly concave recesses and upwardly convex protrusions alternatively formed along the left-and-right direction, the upper rail has upwardly concave recesses and downwardly convex protrusions alternatively formed along the left-and-right direction, the upwardly convex protrusion of the lower rail has a lower engagement structure, and the downwardly convex protrusion of the upper rail has an upper engagement structure, and by engagement between the lower engagement structure and the upper engagement structure, the upper rail and the lower rail are coupled to form the container rail assembly.

3. The image forming apparatus according to claim 1, comprising:

a main body frame which supports the container housing, wherein the lower rail includes a positioning structure which is positioned with respect to the main body frame.

4. The image forming apparatus according to claim 1, comprising:

front and rear connection structures which connect the container rail assemblies in the upper-and-lower direction, wherein one of the connection structures positions the two container rail assemblies disposed in the upper-and-lower direction in a front-and-rear direction and in the left-and-right direction, and the other of the connection structures positions the two container rail assemblies disposed in the upper-and-lower direction in the upper-and-lower direction.

5. The image forming apparatus according to claim 2, wherein the container housing includes:

a cover which opens and closes the opening of the opening frame; and a locking mechanism which lokes the cover to a close posture for closing the opening, and the locking mechanism is housed in the downwardly convex protrusion of the upper rail.

* * * * *